(12) United States Patent
Bradfield

(10) Patent No.: US 8,269,383 B2
(45) Date of Patent: Sep. 18, 2012

(54) ELECTRIC MACHINE COOLING SYSTEM AND METHOD

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 192 days.

(21) Appl. No.: 12/796,557

(22) Filed: Jun. 8, 2010

(65) Prior Publication Data

US 2011/0298316 A1 Dec. 8, 2011

(51) Int. Cl.
*H02K 9/00* (2006.01)
(52) U.S. Cl. .............................. 310/58; 310/61; 310/62
(58) Field of Classification Search .................. 310/58, 310/61, 52, 59
See application file for complete search history.

(56) References Cited

U.S. PATENT DOCUMENTS

| | | | | | |
|---|---|---|---|---|---|
| 2,891,391 | A | * | 6/1959 | Grant et al. | 62/475 |
| 2,947,892 | A | * | 8/1960 | Inculet et al. | 310/57 |
| 2,951,954 | A | * | 9/1960 | Willyoung | 310/61 |
| 3,007,064 | A | * | 10/1961 | Ward | 310/54 |
| 3,110,827 | A | * | 11/1963 | Baudry | 310/55 |
| 3,188,833 | A | * | 6/1965 | Robinson | 62/505 |
| 3,435,263 | A | * | 3/1969 | Willyoung | 310/61 |
| 3,439,202 | A | * | 4/1969 | Wanke | 310/52 |
| 3,558,943 | A | * | 1/1971 | Nilsson | 310/58 |
| 3,643,119 | A | * | 2/1972 | Lukens | 310/60 R |
| 3,701,911 | A | * | 10/1972 | Hallerback | 310/60 R |
| 3,748,507 | A | * | 7/1973 | Sieber | 310/58 |
| 3,800,173 | A | * | 3/1974 | Rosenberry, Jr. | 310/59 |
| 3,932,778 | A | * | 1/1976 | Watanabe et al. | 310/61 |
| 4,301,386 | A | * | 11/1981 | Schweder et al. | 310/59 |
| 4,365,178 | A | * | 12/1982 | Lenz | 310/61 |
| 4,547,688 | A | * | 10/1985 | Hammer et al. | 310/59 |
| 4,745,315 | A | * | 5/1988 | Terry et al. | 310/68 D |
| 4,845,394 | A | * | 7/1989 | Kleinhans | 310/64 |
| 5,019,733 | A | * | 5/1991 | Kano et al. | 310/61 |
| 5,081,382 | A | * | 1/1992 | Collings et al. | 310/54 |
| 5,180,004 | A | * | 1/1993 | Nguyen | 165/140 |
| 5,207,121 | A | * | 5/1993 | Bien | 74/606 R |
| 5,319,272 | A | * | 6/1994 | Raad | 310/68 D |
| 5,372,213 | A | * | 12/1994 | Hasebe et al. | 180/65.6 |
| 5,557,153 | A | * | 9/1996 | Zimmermann | 310/56 |
| 5,616,973 | A | | 4/1997 | Khazanov | |

(Continued)

FOREIGN PATENT DOCUMENTS

JP 05-292704 A 11/1993

(Continued)

OTHER PUBLICATIONS

International Search Report, Received Jan. 9, 2012.

(Continued)

*Primary Examiner* — Quyen Leung
*Assistant Examiner* — Alex W Mok
(74) *Attorney, Agent, or Firm* — Greenberg Traurig LLP

(57) ABSTRACT

Embodiments of the invention provide an electric machine module and a method for cooling an electric machine. The electric machine module includes the electric machine including a stator with stator end turns and a housing enclosing the electric machine. An inner wall of the housing defines a machine cavity. The electric machine module also includes a cover coupled to the housing and extending radially inward into the machine cavity. The cover and the stator end turns define a stator cavity which is in fluid communication with the machine cavity.

18 Claims, 5 Drawing Sheets

U.S. PATENT DOCUMENTS

| | | | | |
|---|---|---|---|---|
| 5,757,094 A * | 5/1998 | van Duyn | | 310/58 |
| 5,889,342 A * | 3/1999 | Hasebe et al. | | 310/54 |
| 5,965,965 A * | 10/1999 | Umeda et al. | | 310/52 |
| 6,011,332 A * | 1/2000 | Umeda et al. | | 310/58 |
| 6,069,424 A * | 5/2000 | Colello et al. | | 310/58 |
| 6,087,746 A | 7/2000 | Couvert | | |
| 6,097,130 A * | 8/2000 | Umeda et al. | | 310/263 |
| 6,114,784 A | 9/2000 | Nakano | | |
| 6,147,430 A * | 11/2000 | Kusase et al. | | 310/215 |
| 6,147,432 A * | 11/2000 | Kusase et al. | | 310/260 |
| 6,173,758 B1 * | 1/2001 | Ward et al. | | 165/80.3 |
| 6,181,043 B1 * | 1/2001 | Kusase et al. | | 310/201 |
| 6,208,060 B1 * | 3/2001 | Kusase et al. | | 310/216.069 |
| 6,232,687 B1 * | 5/2001 | Hollenbeck et al. | | 310/88 |
| 6,242,836 B1 * | 6/2001 | Ishida et al. | | 310/215 |
| 6,291,918 B1 * | 9/2001 | Umeda et al. | | 310/215 |
| 6,313,559 B1 * | 11/2001 | Kusase et al. | | 310/216.001 |
| 6,333,573 B1 * | 12/2001 | Nakamura | | 310/45 |
| 6,335,583 B1 * | 1/2002 | Kusase et al. | | 310/216.004 |
| 6,340,853 B1 * | 1/2002 | Kaiho et al. | | 310/61 |
| 6,346,758 B1 * | 2/2002 | Nakamura | | 310/216.004 |
| 6,404,628 B1 * | 6/2002 | Nagashima et al. | | 361/690 |
| 6,417,592 B2 * | 7/2002 | Nakamura et al. | | 310/184 |
| 6,459,177 B1 * | 10/2002 | Nakamura et al. | | 310/216.136 |
| 6,515,392 B2 * | 2/2003 | Ooiwa | | 310/179 |
| 6,522,043 B2 * | 2/2003 | Masegi | | 310/180 |
| 6,559,572 B2 * | 5/2003 | Nakamura | | 310/216.071 |
| 6,579,202 B2 * | 6/2003 | El-Antably et al. | | 475/159 |
| 6,770,999 B2 * | 8/2004 | Sakurai | | 310/208 |
| 6,779,799 B2 * | 8/2004 | Tong et al. | | 277/411 |
| 6,897,594 B2 * | 5/2005 | Ichikawa et al. | | 310/201 |
| 6,998,749 B2 * | 2/2006 | Wada et al. | | 310/184 |
| 7,002,267 B2 * | 2/2006 | Raszkowski et al. | | 310/54 |
| 7,071,586 B2 * | 7/2006 | Hattori et al. | | 310/58 |
| 7,173,358 B2 * | 2/2007 | Drubel | | 310/201 |
| 7,239,055 B2 * | 7/2007 | Burgman et al. | | 310/52 |
| 7,276,006 B2 * | 10/2007 | Reed et al. | | 475/5 |
| 7,284,313 B2 * | 10/2007 | Raszkowski et al. | | 29/596 |
| 7,294,943 B2 * | 11/2007 | Hattori et al. | | 310/58 |
| 7,339,300 B2 * | 3/2008 | Burgman et al. | | 310/112 |
| 7,352,091 B2 * | 4/2008 | Bradfield | | 310/68 D |
| 7,417,344 B2 * | 8/2008 | Bradfield | | 310/90 |
| 7,462,962 B2 * | 12/2008 | De Bock et al. | | 310/58 |
| 7,508,100 B2 * | 3/2009 | Foster | | 310/54 |
| 7,538,457 B2 * | 5/2009 | Holmes et al. | | 310/54 |
| 7,545,060 B2 * | 6/2009 | Ward | | 310/54 |
| 7,615,903 B2 * | 11/2009 | Holmes et al. | | 310/90 |
| 7,615,951 B2 * | 11/2009 | Son et al. | | 318/432 |
| 7,667,359 B2 * | 2/2010 | Lee et al. | | 310/86 |
| 7,812,501 B2 * | 10/2010 | Taniyama et al. | | 310/270 |
| 7,816,824 B2 * | 10/2010 | Jockel | | 310/57 |
| 2001/0054852 A1 * | 12/2001 | Nakamura et al. | | 310/58 |
| 2002/0130566 A1 * | 9/2002 | Greubel et al. | | 310/58 |
| 2002/0149273 A1 * | 10/2002 | Soitu et al. | | 310/58 |
| 2003/0011253 A1 * | 1/2003 | Kalsi et al. | | 310/58 |
| 2003/0038549 A1 * | 2/2003 | Pyrhonen | | 310/58 |
| 2003/0048030 A1 * | 3/2003 | Griffith et al. | | 310/254 |
| 2003/0222519 A1 | 12/2003 | Bostwick | | |
| 2004/0032172 A1 * | 2/2004 | Tong | | 310/58 |
| 2004/0036367 A1 * | 2/2004 | Denton et al. | | 310/61 |
| 2004/0066099 A1 * | 4/2004 | Weeber et al. | | 310/58 |
| 2004/0189110 A1 | 9/2004 | Ide | | |
| 2004/0195929 A1 | 10/2004 | Oshidari | | |
| 2005/0023909 A1 | 2/2005 | Cromas | | |
| 2005/0151430 A1 * | 7/2005 | Lowther | | 310/58 |
| 2005/0206251 A1 * | 9/2005 | Foster | | 310/59 |
| 2006/0024178 A1 * | 2/2006 | Chen et al. | | 417/407 |
| 2006/0055255 A1 * | 3/2006 | Hattori et al. | | 310/58 |
| 2007/0024130 A1 | 2/2007 | Schmidt | | |
| 2007/0052313 A1 | 3/2007 | Takahashi | | |
| 2007/0063607 A1 | 3/2007 | Hattori | | |
| 2007/0096588 A1 * | 5/2007 | Kirchner | | 310/261 |
| 2007/0096590 A1 * | 5/2007 | Salamah et al. | | 310/270 |
| 2007/0126296 A1 * | 6/2007 | Lee et al. | | 310/86 |
| 2007/0216236 A1 | 9/2007 | Ward | | |
| 2007/0236094 A1 * | 10/2007 | Kaminski et al. | | 310/156.28 |
| 2007/0252473 A1 * | 11/2007 | Taniyama et al. | | 310/270 |
| 2008/0143200 A1 * | 6/2008 | Kalsi et al. | | 310/58 |
| 2008/0252169 A1 * | 10/2008 | Fujita et al. | | 310/213 |
| 2009/0033160 A1 * | 2/2009 | Mueller | | 310/58 |
| 2009/0033161 A1 * | 2/2009 | Bradfield | | 310/62 |
| 2009/0108714 A1 * | 4/2009 | Fakes | | 310/60 A |

FOREIGN PATENT DOCUMENTS

| | | | | |
|---|---|---|---|---|
| JP | 09-046973 A | | | 2/1997 |
| JP | 11-132867 A | | | 5/1999 |
| JP | 2000-152561 A | | | 5/2000 |
| JP | 2000152561 A | * | | 5/2000 |
| JP | 2000-324757 A | | | 11/2000 |
| JP | 2000-333409 A | | | 11/2000 |
| JP | 2000333409 A | * | | 11/2000 |
| JP | 2002-095217 A | | | 3/2002 |
| JP | 2003009467 A | * | | 1/2003 |
| JP | 2003169448 A | * | | 6/2003 |
| JP | 2004-215353 A | | | 7/2004 |
| JP | 2006-060914 A | | | 3/2006 |
| JP | 2000-152561 A | | | 9/2006 |
| JP | 2007-282341 A | | | 10/2007 |
| JP | 2008-029150 A | | | 2/2008 |
| JP | 2008-206213 A | | | 9/2008 |
| JP | 2009-247084 A | | | 10/2009 |
| JP | 2010-028958 A | | | 2/2010 |
| JP | 2010-035265 A | | | 2/2010 |
| KR | 10-1997-0055103 A | | | 7/1997 |
| KR | 10-2006-0102496 A | | | 9/2006 |
| KR | 10-2007-0027809 A | | | 3/2007 |
| KR | 10-2009-0048028 A | | | 5/2009 |

OTHER PUBLICATIONS

International Search Report, Received Feb. 16, 2012.
International Search Report, Received Dec. 22, 2011.
International Search Report, Received Dec. 5, 2011.
International Search Report, Received Dec. 27, 2011.

* cited by examiner

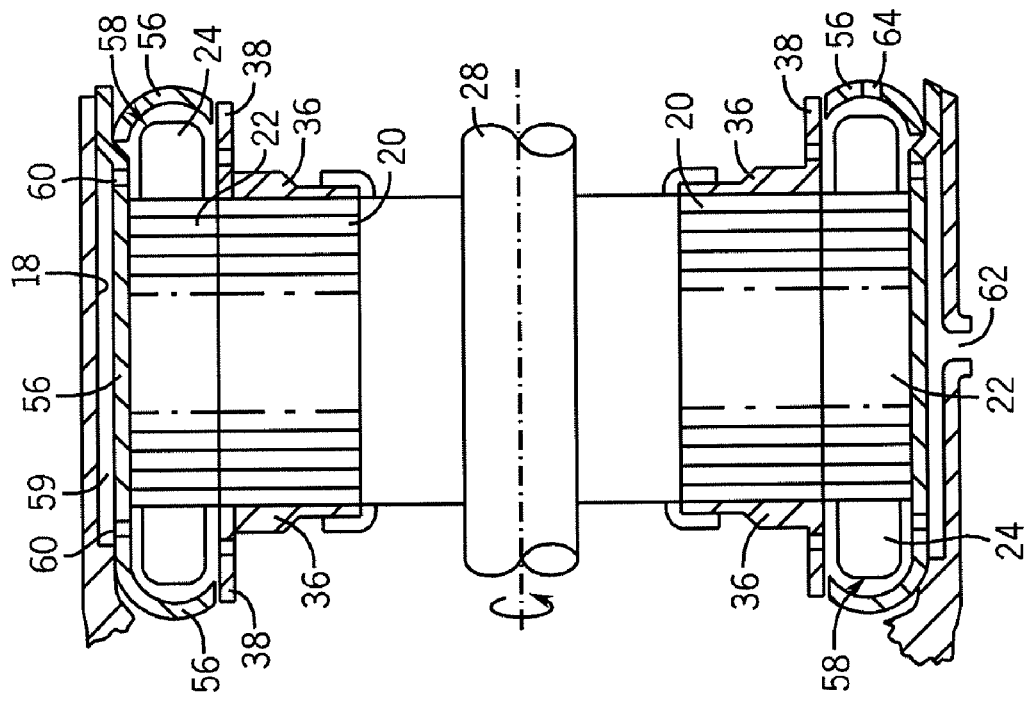
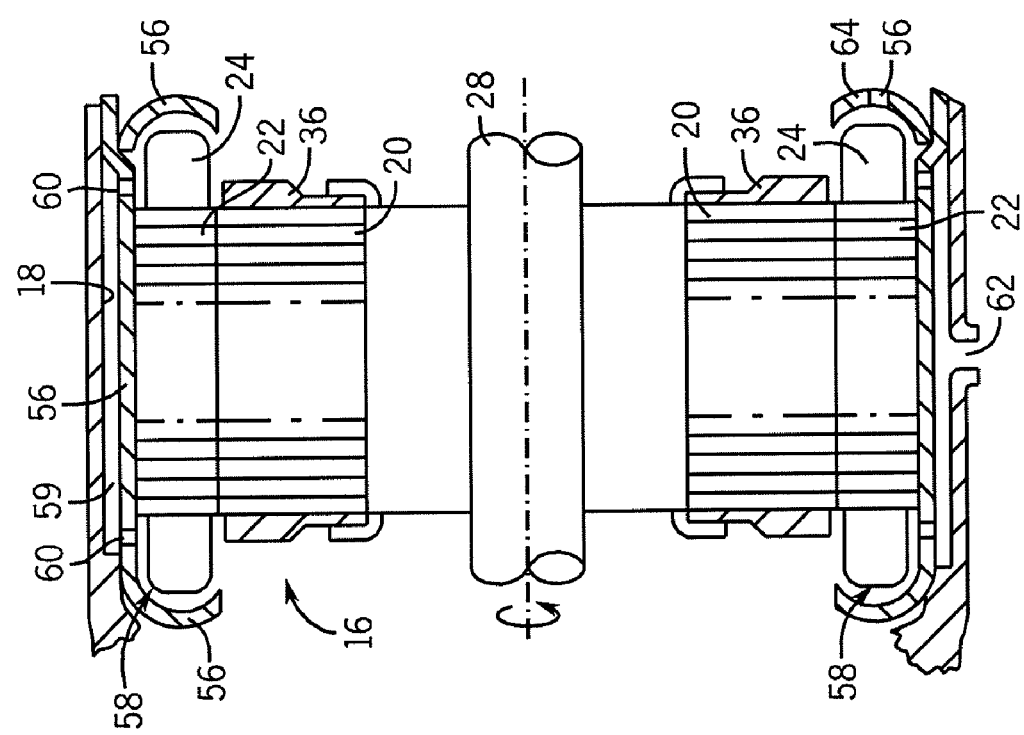

ELECTRIC MACHINE COOLING SYSTEM AND METHOD

BACKGROUND

Hybrid vehicles offer an opportunity for vehicle drivers to engage in environmentally-conscious behavior because of hybrids' improved fuel economy and reduced emissions. Hybrid vehicles combine traditional internal combustion engines with an electro-mechanical transmission. Electric motors located within the electro-mechanical transmission provide energy to propel the vehicle, reducing the need for energy provided by the internal combustion engine, thereby increasing fuel economy and reducing emissions.

As with any electric machine, the hybrid transmission's electric motor rejects some energy in the form of heat. Efficient removal of heat from the electric motor can improve the lifespan of the electric machine as well as improve the electric machine's operating efficiency.

SUMMARY

Some embodiments of the invention provide an electric machine module capable of being cooled by a coolant. The electric machine module can include an electric machine including a stator with stator end turns and a housing enclosing the electric machine. An inner wall of the housing can define a machine cavity. The electric machine module can also include a cover coupled to the housing and extending radially inward into the machine cavity. The cover and the stator end turns can define a stator cavity which is in fluid communication with the machine cavity.

In some embodiments, the electric machine module can include an electric machine including a stator with stator end turns and a rotor. The electric machine module can also include a housing enclosing the electric machine. An inner wall of the housing can define a machine cavity. The electric machine module can further include a cover coupled to the housing and extending radially inward into the machine cavity, and an agitator ring operatively coupled to the rotor and extending substantially outward along at least a portion of an axial length of the stator end turns. The cover, the agitator ring, and the stator end turns can define a stator cavity, the stator cavity being in fluid communication with the machine cavity.

Some embodiments of the invention provide a method for cooling an electric machine. The method can include providing the electric machine including a rotor with generally opposing end faces and a stator substantially circumscribing the rotor and including stator end turns. The method can also include substantially enclosing at least a portion of the electric machine substantially within a housing and defining at least a portion of a machine cavity with an inner wall of the housing. The method can further include providing a cover coupled to the housing and extending radially inward into the machine cavity, introducing a coolant into the machine cavity, and concentrating the coolant near the stator end turns using the cover in order to cool the stator end turns.

DESCRIPTION OF THE DRAWINGS

FIG. 7A is a cross-sectional view of an electric machine module according to another embodiment of the invention.

FIG. 7B is a cross-sectional view of an electric machine module according to yet another embodiment of the invention.

DETAILED DESCRIPTION

Figure 1:
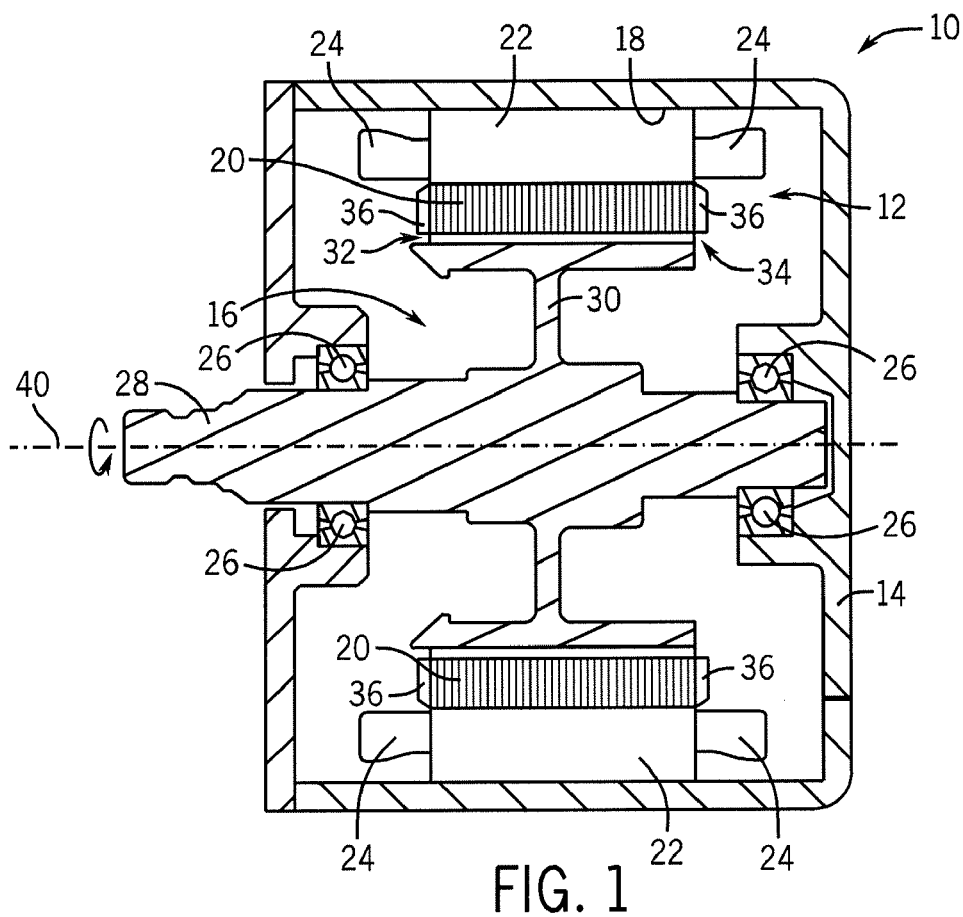
FIG. 1 is a cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an electric machine module 10 according to one embodiment of the invention. The machine module 10 can include an electric machine 12 and a housing 14. The electric machine 12 can be disposed within a machine cavity 16 defined at least partially by an inner wall 18 of the housing 14. The electric machine 12 can include a rotor 20, a stator 22 substantially circumscribing the rotor 20, stator end turns 24, and bearings 26, and can be disposed about a main output shaft 28. In some embodiments, the electric machine 12 can also include a rotor hub 30 or can have a "hub-less" design (not shown).

The electric machine 12 can be, without limitation, an electric motor, such as a hybrid electric motor, an electric generator, or a vehicle alternator. In one embodiment, the electric machine 12 can be an induction belt-alternator-starter (BAS). In another embodiment, the electric machine 12 can be a High Voltage Hairpin (HVH) electric motor for use in a hybrid vehicle.

Components of the electric machine 12 such as, but not limited to, the stator end turns 24, the rotor 20, and the rotor hub 30 can generate heat during operation of the electric machine 12. These components can be cooled to enhance the performance of and increase the lifespan of the electric machine 12.

Figure 3:
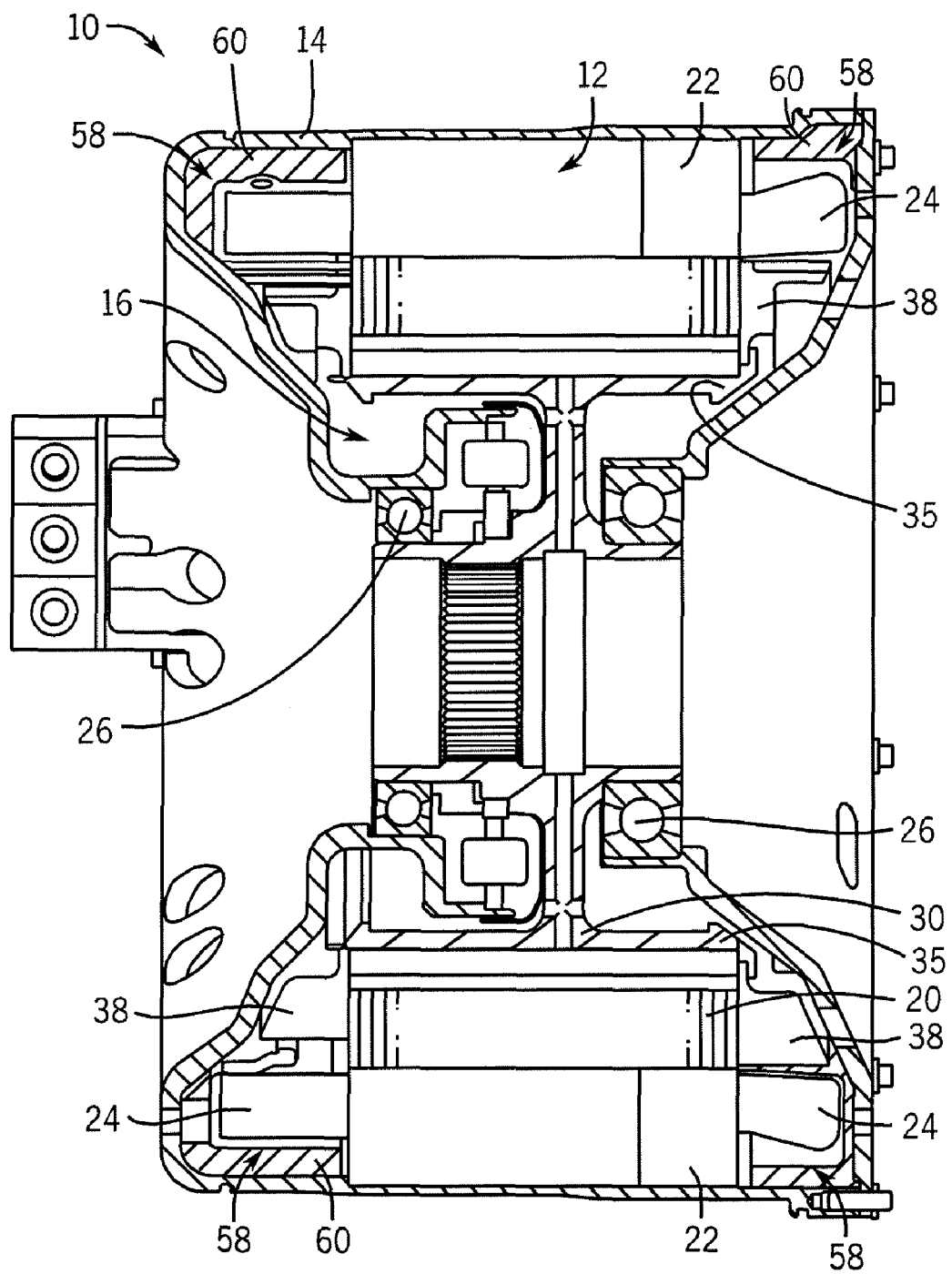
FIG. 3 is another cross-sectional view of the electric machine module according to one embodiment of the invention.

As shown in FIG. 1, the rotor 20 can include generally opposing end faces 32, 34. A balance ring 36 can be coupled to the rotor 20 and/or the rotor hub 30 at a location proximal to the generally opposing end faces 32, 34. In some embodiments, the balance ring 36 can be coupled to the rotor hub 30 using threads, a plurality of threaded fasteners, a friction fitting, welding, or another conventional coupling manner so that the balance ring 36 can rotate substantially synchronously with the rotor 20 and the rotor hub 30 during operation of the electric motor 12. In addition, the balance ring 36 can be "staked" to a lip 35 on an inner diameter of the rotor hub 30 and a portion of the balance ring 36 can be heat pressed to a lamination stack of the rotor 20 (e.g., for axial support), as shown in FIG. 3. Additional components, such as steel insert pieces, can also be used to help clamp the balance ring 36 to the rotor hub 30 around the lip 35. The balance ring 36 can extend axially from the rotor hub 30 into the machine cavity 16 and can provide stability for the rotor 20 and rotor hub 30 during operation of the electric machine 12. In one embodiment, the balance ring 36 comprises cast aluminum.

Figure 2:
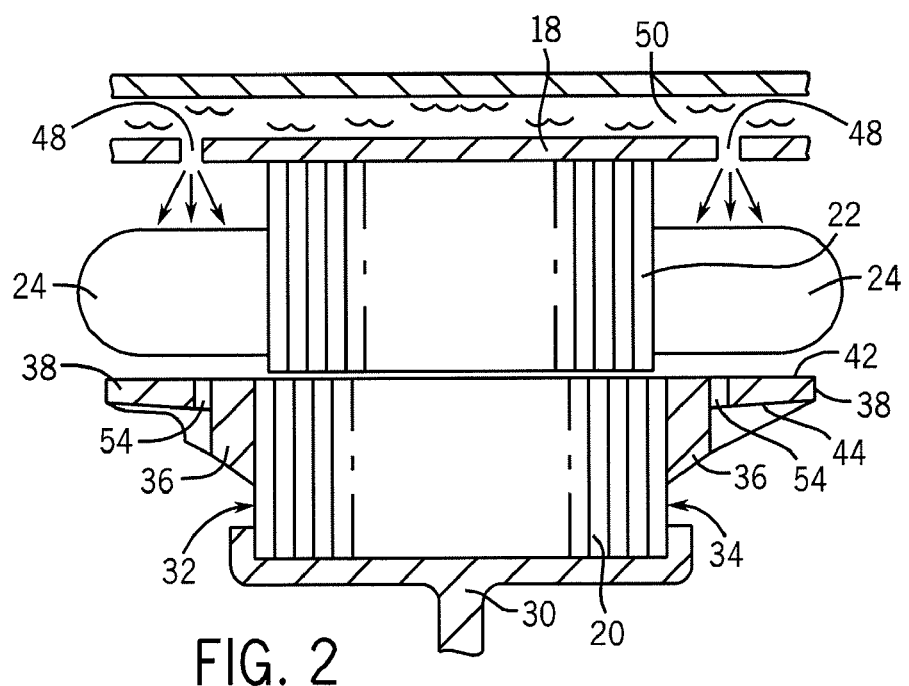
FIG. 2 is a partial cross-sectional view of an electric machine with an agitator member, according to one embodiment of the invention.

In other embodiments, such as those including the hub-less design, the balance ring 36 can be coupled to the rotor 20 proximal to the generally opposing end faces 32, 34, as shown in FIG. 2. The balance ring 36 can be coupled to the rotor 20 using threads, a plurality of threaded fasteners, a friction fitting, welding, or another conventional coupling manner so that the balance ring 36 can rotate substantially synchronously with the rotor 20 during operation of the electric motor 12. The balance ring 36 can provide stability for the rotor 20 during operation of the electric machine 12. In either the hub-less design or embodiments including the rotor hub 30, the balance ring 36 can be operatively coupled to the rotor 20 (i.e., through direct coupling or coupling via the rotor hub 30) due to the fact that it can rotate with the rotor 20 during operation of the electric machine.

In some embodiments, an agitator member 38 can be a ring-shaped member coupled to the rotor 20, the rotor hub 30, and/or the balance ring 36 proximal to the generally opposing end faces 32, 34. More specifically, at least a portion of the agitator member 38 can be coupled to the rotor 20, the rotor hub 30 and/or the balance ring 36 such that the agitator member 38 synchronously rotates with the rotor 20 and the rotor hub 30 when the electric machine 12 is in operation. The agitator member 38 can be coupled to the rotor 20, the rotor hub 30, and/or the balance ring 36 using threads, one or more threaded fasteners, a friction fitting, welding, or another conventional coupling manner. In one embodiment, the agitator member 38 can be staked to a lip (not shown) on the inner diameter of the rotor hub 20 and further axial support can be provided by heat pressing a portion of the agitator member 34 in a lamination stack surrounding the rotor 20. In another embodiment, the agitator member 38 can be cast as part of the rotor 20 during rotor fabrication so that the agitator member 38 and the rotor 20 are integral. In yet another embodiment, the agitator member 38 can be integral with the balance ring 36. The agitator member 38 can extend axially away from the rotor 20 and/or the rotor hub 30 into the machine cavity 16.

In some embodiments, the agitator member 38 can be coupled to the rotor 20 and/or the rotor hub 30 with or without the balance ring 36. If the balance ring 36 is present, an axial length of the agitator member 38 can be substantially equal to or longer than an axial length of the balance ring 36. For example, in one embodiment, at least a portion of the agitator member 38 can extend axially past the balance ring 36 (i.e., axially away from the rotor 20). In addition, the agitator member 38 can extend substantially parallel to the stator end turns 24 along at least a portion of an axial length of the stator end turns 24. In some embodiments, the agitator member 38 can extend substantially axially outward about as far as the stator end turns 24. In other embodiments, the axial length of the agitator member 38 can be shorter than or longer than the axial length of the stator end turns 24.

In either the hub-less design or embodiments including the rotor hub 30, the agitator member 38 can be operatively coupled to the rotor 20 (i.e., through direct coupling or coupling via the rotor hub 30 or the balance ring 36) due to the fact that it can rotate with the rotor 20 during operation of the electric machine.

In some embodiments, the agitator member 38 and the balance ring 36 can be an integral structure, as described above. In other embodiments, the balance ring 36 and the agitator member 38 can comprise two or more independent components. The balance ring 36 and the agitator member 38 can be fabricated from aluminum, steel, stainless steel, or other similar materials. In some embodiments, the agitator member 38 can be oriented so that it extends substantially parallel to an axis of rotation 40 of the rotor 20. In other embodiments, the agitator member 38 can be oriented in either a positive or negative direction relative to the rotor's axis of rotation 40.

Figure 4:
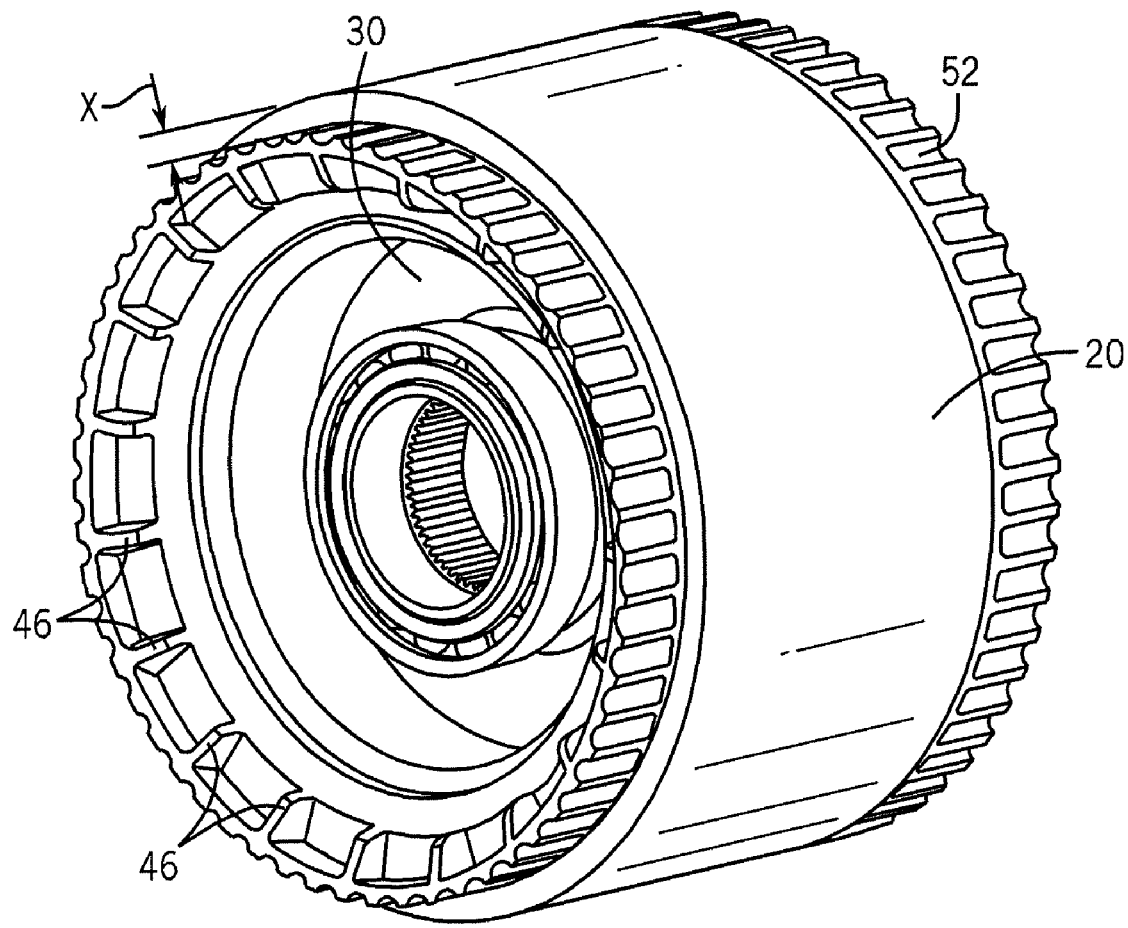
FIG. 4 is a perspective view of a portion of the electric machine of FIG. 2.

In addition, the agitator member 38 can include a radially distal surface 42 and a radially proximal surface 44. The radial location of a both the radially distal surface 42 and the radially proximal surface 44 can vary. For example, the radially distal surface 42 can have a shorter radius than the rotor 20 (e.g., by a length "x", as shown in FIG. 4) or can have a radius equal to a radius of the rotor 20 (as shown in FIG. 2). In some embodiments, the radially distal surface 42 can have a shorter radius than the radius of the rotor 20 to provide substantial radial separation between an underside of the stator end turns 24 and the agitator member 38.

In some embodiments, as shown in to FIG. 4, a plurality of struts 46 can provide support for the agitator member 38. The plurality of struts 46 can be cast or otherwise formed in the agitator member 38 so that the struts 46 and the agitator member 38 are a unitary body.

In some embodiments, at least a portion of the housing 14 can include a plurality of coolant apertures 48. The coolant apertures 48 can be in fluid communication with, for example, a coolant jacket 50 located substantially around the electric machine 12 (e.g., within an inner wall of the housing 14 or along the outside or inside of the housing 14 substantially surrounding an outer diameter of the stator 22) and the machine cavity 16. A coolant, such as transmission fluid, ethylene glycol, an ethylene glycol/water mixture, water, oil, or a similar substance, can originate from a fluid source (not shown), flow throughout the coolant jacket 50, and can be dispersed through the coolant apertures 48 into the machine cavity 16.

In one embodiment, the coolant apertures 48 can be positioned so that the coolant can be dispersed onto the stator end turns 24, as shown in FIG. 2. After reaching the stator end turns 24, the coolant can receive heat energy from the stator end turns 24, which can result in cooling of the electric machine 12. Some of the coolant can be dispersed past the stator end turns 24 or, for example, splash or drip from the stator end turns 24 onto the radially distal surface 42 of the agitator member 38. In addition, some of the coolant that comes in contact with the stator end turns 24 can continue to flow toward the radially distal surface 42. As the coolant reaches the radially distal surface 42, the coolant can be substantially radially slung back outward on to the stator end turns 24 due to the rotation of the agitator member 38 in synchronicity with the rotor 20. The process of radially slinging the coolant toward the stator end turns 24 can serve to recycle the coolant, and thus, maximize cooling potential of the coolant.

In some embodiments, the process of radially slinging the coolant back toward the stator end turns 24 using the agitator member 38 can be considered a "multiple-pass" method of cooling, as the coolant can reach the stator end turns 24 multiple times to provide additional cooling. Conventional electric machines use a "single-pass" method of cooling where the coolant only reaches the stator end turns 24 once and then is discharged away from the electric machine 12 without further cooling benefits. In addition, the single-pass method only permits the coolant to reach radially outer surfaces of the stator ends turns 24, whereas the multiple-pass method allows coolant to be slung back towards radially inner surfaces of the stator end turns 24. As a result, the multiple-pass cooling method allows the coolant to reach both the radially outer surface as well as the radially inner surface of the stator end turns 24, and thus, provides enhanced cooling.

Figure 5:
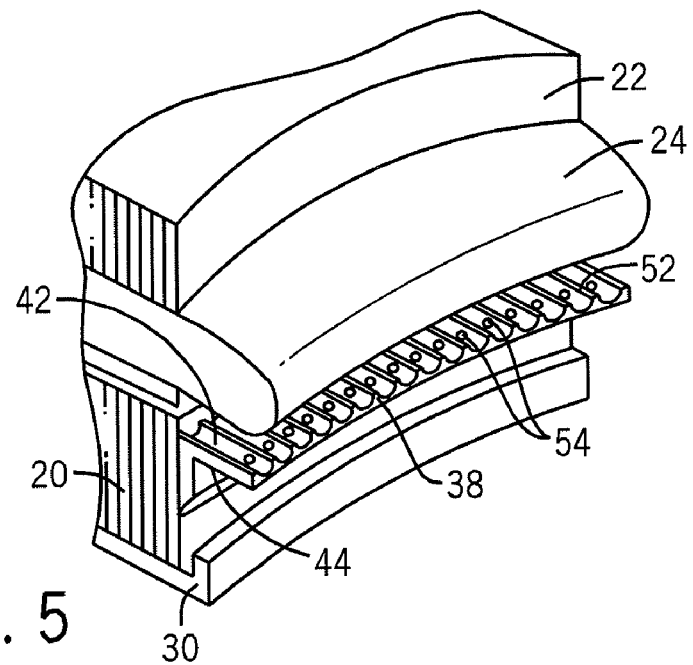
FIG. 5 is a partial perspective view of a portion of the electric machine of FIG. 2.
Figure 6:
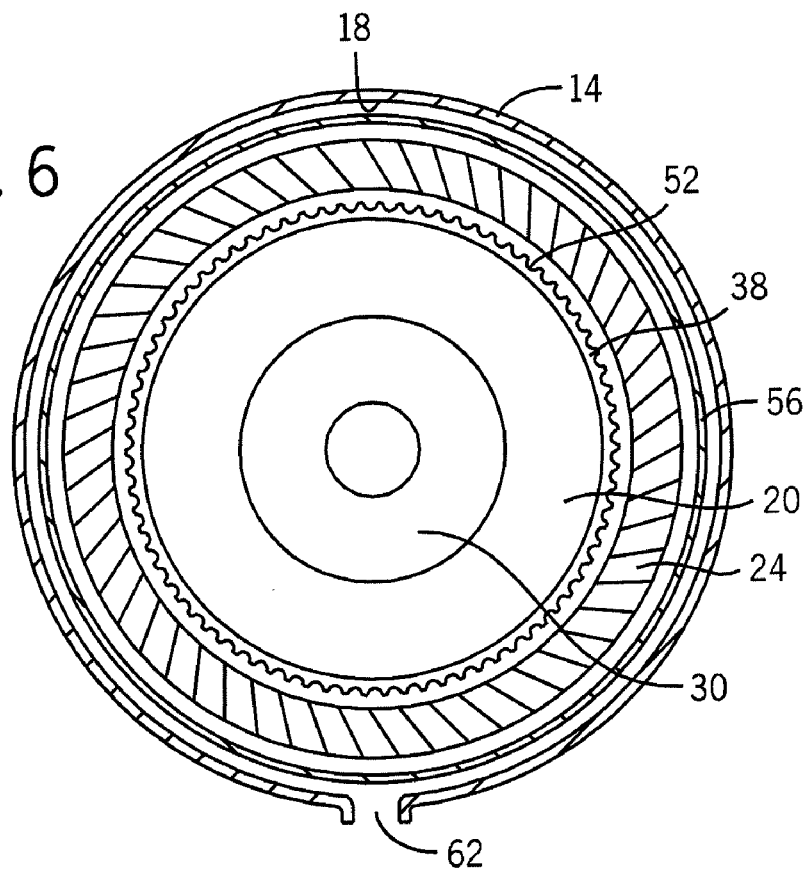
FIG. 6 is a cross-sectional view of the electric machine of FIG. 2.

In one embodiment, as shown in FIGS. 4, 5, and 6, the radially distal surface 42 can include a textured surface 52. The textured surface 52 can have different textures such as scalloping, ribbing, ridging, etc. In some embodiments, the textured surface 52 can be asymmetric in shape to increase the force with which the coolant is slung. In another embodiment, the radially distal surface 42 can lack texture and can include a substantially planar or smooth surface.

In comparison to conventional balance rings, the agitator member 38, including the textured surface 52 or the substantially planar surface, can enhance radial slinging of the coolant because it provides more surface area to receive the coolant. Also, because the agitator member 34 can synchronously rotate with the rotor 20 and/or the rotor hub 30, centrifugal force can force the coolant away from the agitator member 38 so that the coolant can be dispersed onto the stator end turns 24. In one embodiment, the amount and shape of texturing on the textured surface 52 can be selected to provide a desired amount of cooling without slinging the coolant at velocities which can possibly erode the stator end turns 24. In addition, compared to conventional balance rings, the agitator member 38 can further increase air circulation within the machine cavity 16, and thus, enhance electric machine cooling, because its larger mass, relative to a balance ring alone, can displace more air when the agitator member 38 is in motion. In one embodiment, the textured surface 52 can be shaped similar to pump or fan vanes to help increase air circulation and/or increase radial slinging of the coolant.

In some embodiments, the agitator member 38 can include a plurality of agitator channels 54. As shown in FIGS. 2 and 5, the agitator channels 54 can extend radially through the agitator member 38. The plurality of agitator channels 54 can extend through any desired radial length of the agitator member 38, such as a full length of the agitator member 34 or a portion of the full length of the agitator member 38. The agitator channels 54 can be positioned at nearly any distance along the axial length of the agitator member 38 (e.g., more proximal to the rotor 20, centrally along the axial length, or more distal from the rotor 20). For example, as shown in FIG. 5, the plurality of agitator channels 54 can be positioned axially distal from the rotor 20. The location of each of the plurality of agitator channels 54 can be symmetric or asymmetric along the agitator member 38 (i.e., not each agitator channel may be positioned at the same distance along the axial length of the agitator member 38).

Additionally, any number of agitator channels 54 can be included in the agitator member 38, or in attachments to the agitator member 38. In some embodiments, as shown in FIG. 5, each of the plurality of agitator channels 54 can be circular in shape. In other embodiments, the agitator channels 54 can have similar or different shapes, including circular, square, rectangle, oval, and/or other shapes. Also, the plurality of agitator channels 54 can include similar or varying radii or diameters. The agitator channels 54 can be of sufficient size to allow passage of a portion of the coolant through the agitator channels 54, as described below. The agitator channels 54 can be sized and positioned so that another portion of the coolant that reaches the agitator member 38 can continue to be substantially radially slung toward the stator end turns 24.

In some embodiments, an additional volume of the coolant also can be expelled near the rotor hub 30, for example, from a base of the rotor hub 30 or from the main input shaft 28. The coolant expelled near the rotor hub 30 can flow radially outward toward the housing 12 (e.g., due to centrifugal force). A portion of the coolant can reach the radially proximal surface 44 of the agitator member 38, and the agitator channels 54 can provide a pathway for the coolant to flow between the radially proximal surface and the radially distal surface. More specifically, the coolant 50 flowing radially outward onto the agitator member 38 can flow through the agitator channels 54 so that it reaches the radially distal surface 42 and is substantially radially slung toward the stator end turns 24, or at least concentrated near the stator end turns 24. The additional volume of coolant can further aid in cooling the electric machine 12, including the stator end turns 24.

FIGS. 7A and 7B illustrate the electric machine module 10 according to another embodiment of the invention. As shown in FIG. 7A, a cover 56 can be coupled to the inner wall 18 and at least partially surround the stator end turns 24 so that the cover 56 and each of the stator end turns 24 define a stator cavity 58 around the stator end turns 24. The stator cavity 58 can be in fluid communication with the machine cavity 16. The cover 56 can also substantially surround the stator 22. For example, FIG. 7A illustrates the cover entirely surrounding the stator 22 as well as partially surrounding the stator end turns 24 (e.g., as an integral stator housing ring and cover assembly). In some embodiments, additional caps (not shown) can enclose the cover 56 within the housing 14. In other embodiments, the cover 56 can be a part of the housing 14 (e.g., extending from the inner wall 18 on either end of the stator 22 to partially surround the stator end turns 24).

The cover 56 can extend a desired radial distance from the inner wall 18 and, in some embodiments, can turn back inward axially, as shown in FIGS. 7A and 7B. The cover 56 can also be positioned a desired axial distance from the housing 14. The desired distances can be uniform or vary along radial portions of, or along the circumference of, the electric machine 12 and, as a result, the stator cavity 58 can be uniform or vary in size along the radial portions. In addition, in some embodiments, the stator cavity 58 may not extend around the entire 360 degrees of the stator end turns 24 (i.e., some radial portions of the stator end turns 24 are not surrounded by the cover 56).

The cover 56 can comprise plastic, aluminum, steel, a polymeric material, or a similar material. In some embodiments, the size of the stator cavity 58 can vary depending on the dielectric properties of the coolant and the materials from which the cover 56 are fabricated or depending on its radial position within the electric machine module 10. In one embodiment, the size of the stator cavity 58 can be reduced by coating an area of the cover 56 closest to the stator end turns 24 with a material of high dielectric strength, such as an epoxy material 60, as shown in FIG. 3. In another embodiment, an upper portion of the electric machine module 10 can include a substantially larger stator cavity 58 than a lower portion of the electric machine module 10.

In some embodiments, the cover 56 can be coupled to the inner wall 18 by press fitting, friction fitting, threaded fasteners, or a similar coupling manner. In addition, the cover 56 can comprise one or more parts, where some parts of the cover 56 are integral with the inner wall 18 and other parts of the cover are coupled to the inner wall 18. The stator cavity 58 can receive the coolant from the cooling jacket 50 and the coolant apertures 48 (similar to that shown in FIG. 2), or from a cooling jacket 59 formed between the cover 56 and the inner wall 18 through coolant apertures 61 of the cover 56. The cooling jacket 59 can receive the coolant from a feed port 62, as shown in FIGS. 6-7B, in fluid communication with the fluid source. After the coolant flows into the stator cavity 58, the cover 56 can help concentrate the flowing coolant within the stator cavity 52 so that the coolant can remain in contact with or near the stator end turns 24 for a prolonged time period in order to help transfer more heat energy. The coolant can eventually disperse out of the stator cavity 58 toward the machine cavity 16. Compared to conventional cooling systems, the cover 56 can greatly enhance cooling of the stator end turns 24 because the cover 56 can prevent at least some of the coolant from quickly dispersing away from the stator end turns 24 and can help concentrate the coolant near the heat energy-radiating stator end turns 24.

In one embodiment, as shown in FIG. 7B, the stator cavity 58 can be defined by the cover 56 and the stator end turns 24 as well as the agitator member 38. The stator cavity 58 can be in fluid communication with the machine cavity 16, as described above. When the coolant enters the stator cavity 58, the coolant can flow onto the stator end turns 24 and can be concentrated within the stator cavity 58 by the presence of the cover 56. In addition, when the coolant flows toward the agitator member 38, it can be radially slung back toward the stator end turns 24 and the cover 56 where it can once again become concentrated around the stator end turns 24. The combination of the cover 56 and the agitator member 38 can synergistically improve cooling efficiency by applying and recycling the coolant near and around the stator end turns 24.

Because the stator cavity 58 can be in fluid communication with the machine cavity 16 in some embodiments, some of the coolant can flow into the machine cavity 16 while a significant portion of the coolant can remain within the stator cavity 58. In some embodiments, further cooling can be achieved using an additional volume of coolant expelled from near the rotor hub 30. The additional volume of coolant can flow radially outward, through some of the plurality of agitator channels 52, and toward the stator cavity 58 so that it can be applied and reapplied to the stator end turns 24. The additional flow of coolant can lead to more efficient heat energy transfer because of exchange of the coolant and repeated recycling of the coolant near the stator end turns 24.

After flowing over the electric machine components, the coolant can pool at or near a bottom portion of the housing 12 (e.g., by flowing in the machine cavity 16 outside of the cover 56 or through drain ports 64 of the cover 56). A drain (not shown) can be located at or near the bottom portion in order permit removal of pooling coolant from the housing 12. The drain can be coupled to an element which can remove the heat energy from the drained coolant, such as a radiator or other suitable heat exchanger, so that it can be circulated back to the fluid source.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module capable of being cooled by a coolant, the electric machine module comprising:
   an electric machine including a stator with stator end turns;
   a housing enclosing the electric machine, an inner wall of the housing defining a machine cavity, the housing further comprising a coolant jacket circumscribing at least a portion of the electric machine and at least one coolant aperture being positioned substantially adjacent to at least a portion of the stator end turns, the coolant jacket capable of containing a volume of the coolant, the at least one coolant aperture being configured to disperse at least a portion of the coolant from the coolant jacket into a stator cavity; and
   a cover coupled to the housing and extending radially inward into the machine cavity, the cover and the stator end turns defining the stator cavity, the stator cavity being in fluid communication with the machine cavity, wherein the cover is configured and arranged to concentrate at least a portion of the coolant within the stator cavity substantially around the stator end turns when the coolant enters the machine cavity from the at least one coolant aperture.

2. The electric machine module of claim 1, wherein the cover at least partially surrounds the stator end turns.

3. The electric machine module of claim 1, wherein the cover entirely surrounds the stator.

4. The electric machine module of claim 1, wherein the cover extends axially inward to at least partially surround the stator end turns.

5. The electric machine module of claim 1, wherein the cover is located an axial distance away from axial ends of the housing, wherein the axial distance varies along a circumference of the housing.

6. The electric machine module of claim 1, wherein the cover comprises at least one of plastic, aluminum, steel and a polymeric material.

7. The electric machine module of claim 1 and further comprising an epoxy material filled within at least a portion of the stator cavity between the stator end turns and the cover.

8. An electric machine module capable of being cooled by a coolant, the electric machine module comprising:
   an electric machine including a stator with stator end turns and a rotor;
   a housing enclosing the electric machine, an inner wall of the housing defining a machine cavity;
   a coolant jacket at least partially circumscribing a portion of the stator, the coolant jacket capable of containing a volume of the coolant;

a plurality of coolant apertures being configured to guide a portion of the coolant from the coolant jacket into a stator cavity adjacent to at least a portion of stator end turns;

a cover coupled to the housing and extending radially inward into the machine cavity; and an agitator member operatively coupled to the rotor and extending substantially outward along at least a portion of an axial length of the stator end turns, the cover, the agitator member, and the stator end turns defining the stator cavity, the stator cavity being in fluid communication with the machine cavity, and the agitator member being configured to radially return a portion of the coolant that flows past the stator end turns back to the stator end turns for additional cooling.

9. The electric machine module of claim 8, wherein the electric machine further includes a rotor hub, and the agitator member is coupled to the rotor by the rotor hub.

10. The electric machine module of claim 8, wherein the agitator member includes a radially distal surface and a radially proximal surface, the radially distal surface comprising a textured surface.

11. The electric machine module of claim 8, wherein an axial length of the agitator member is one of less than, more than, and about the same as the axial length of the stator end turns.

12. A method for cooling an electric machine comprising:
providing the electric machine including
a rotor with generally opposing end faces, and
a stator substantially circumscribing the rotor and including stator end turns;
substantially enclosing at least a portion of the electric machine within a housing,
defining at least a portion of a machine cavity with an inner wall of the housing;
circumscribing at least a portion of the stator with a coolant jacket, the coolant jacket capable of containing a volume of a coolant;
disposing a plurality of coolant apertures through a portion of the inner wall, the plurality of coolant apertures being configured to introduce the coolant from the coolant jacket into the machine cavity; and
providing a cover coupled to the housing and extending radially inward into the machine cavity, the cover being configured and arranged to concentrate at least a portion of the coolant introduced into the machine cavity through the plurality of coolant apertures near the stator end turns in order to cool the stator end turns.

13. The method of claim 12 and further comprising coupling an agitator member to the rotor adjacent to the generally opposing end faces, the agitator member being configured to return a portion of the coolant that flows past the stator end turns back to the stator end turns for additional cooling.

14. The method of claim 13 wherein the cover and the agitator member are configured to concentrate at least a portion of the coolant.

15. The method of claim 13 wherein the electric machine is configured so that another volume of coolant is introduced into the machine cavity from a position radially inward from the stator end turns so that the coolant is dispersed radially outward toward the stator end turns.

16. The method of claim 15 and further comprising providing agitator channels through the agitator member to direct the coolant toward the stator end turns.

17. The method of claim 12 wherein the plurality of coolant apertures are positioned radially adjacent to the stator end turns.

18. The method of claim 17 and further comprising positioning the coolant apertures to direct the coolant toward the stator end turns.

* * * * *